United States Patent
Tajima et al.

(10) Patent No.: US 7,878,694 B2
(45) Date of Patent: Feb. 1, 2011

(54) UP-DOWN AND LEFT-RIGHT TILTABLE VEHICULAR LAMP

(75) Inventors: Keiichi Tajima, Shizuoka (JP); Tsutomu Takiguchi, Shizuoka (JP); Naoki Takii, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 268 days.

(21) Appl. No.: 12/034,559

(22) Filed: Feb. 20, 2008

(65) Prior Publication Data

US 2008/0198614 A1 Aug. 21, 2008

(30) Foreign Application Priority Data

Feb. 21, 2007 (JP) ............................. 2007-041056

(51) Int. Cl.
*B60Q 1/04* (2006.01)
(52) U.S. Cl. ....................... 362/530; 362/531; 362/532; 362/428
(58) Field of Classification Search ................. 362/508, 362/523–532, 285–289, 464–469, 386, 272, 362/427, 428
See application file for complete search history.

(56) References Cited

U.S. PATENT DOCUMENTS

| 6,459,476 | B2 | 10/2002 | Nishimura |
| 6,799,876 | B2 * | 10/2004 | Ravier ......................... 362/524 |
| 7,121,706 | B2 * | 10/2006 | Takiguchi et al. ........... 362/524 |
| 7,175,319 | B2 | 2/2007 | Tajima et al. |
| 7,621,663 | B2 * | 11/2009 | Tajima et al. ................ 362/530 |
| 2003/0039124 | A1 * | 2/2003 | Tawa et al. ................... 362/464 |
| 2005/0141234 | A1 * | 6/2005 | Tajima et al. ................ 362/524 |

\* cited by examiner

*Primary Examiner*—Thomas M Sember
(74) *Attorney, Agent, or Firm*—Osha • Liang LLP

(57) ABSTRACT

A vehicular lamp has a lamp unit disposed within a lamp housing, a right-left actuator capable of tilting the lamp unit in a right-left direction, the right-left actuator having a rotational shaft connected to the lamp unit, and an up-down actuator capable of tilting the lamp unit in an up-down direction, the up-down actuator having a retractable shaft connected to a support member that supports the lamp unit. The right-left actuator and the up-down actuator are provided within a single actuator housing. An axial direction of the rotational shaft and an axial direction of the retractable shaft are positioned within an identical plane.

8 Claims, 3 Drawing Sheets

UP-DOWN AND LEFT-RIGHT TILTABLE VEHICULAR LAMP

BACKGROUND OF INVENTION

1. Field of the Invention

The present invention relates to a vehicular lamp capable of precisely changing an irradiation direction rightward, leftward, upward, and downward.

2. Background Art

In a vehicle such as an automobile, for example, an irradiation direction of a headlamp may deviate upward or downward due to a change in payload, and must be adjusted back to the proper irradiation direction. In addition, when the automobile is turning, the irradiation direction of the headlamp must be adjusted to accurately illuminate the direction of travel. Thus, for example, Patent Document 1 proposes a vehicular lamp in which a lamp unit is provided tiltable in the right-left and up-down directions inside a lamp housing, and two driving means are provided inside a single actuator housing by which the lamp unit is moved so as to tilt rightward, leftward, upward, and downward.

According to the vehicular lamp described in Patent Document 1, for example, a single actuator is provided with a swivel shaft that rotates in the right-left direction and a leveling shaft that moves in the front-back direction. The swivel shaft is connected to a lamp unit, and an end of the leveling shaft is connected to a lamp housing. Rotation of the swivel axis moves the lamp unit so as to tilt in the right-left direction, whereas movement of the leveling axis in the front-back direction moves the lamp unit so as to tilt in the up-down direction.

[Patent Document 1]—U.S. Pat. No. 6,459,476 B2

SUMMARY OF INVENTION

However, according to the vehicular lamp described in Patent Document 1, the positions of the swivel shaft and the leveling shaft are not aligned. Namely, a plane on which a rotational axis of the swivel shaft is positioned and a plane on which a movement axis of the leveling shaft is positioned do not coincide. Therefore, movement of the leveling shaft causes torque that is centered around the swivel shaft and acts on the actuator housing (which is connected with the lamp unit). As a consequence, the actuator housing and a mechanism accommodated therein are subjected to torsion, which adversely affects an ability to make precise changes to the irradiation direction.

One or more embodiments of the present invention precisely change an irradiation direction rightward, leftward, upward, and downward.

A vehicular lamp according to one or more embodiments of the present invention has a lamp unit that is structured so as to irradiate light forward and is provided tiltable rightward, leftward, upward, and downward within a lamp housing; right-left driving means for moving the lamp unit so as to tilt in a right-left direction; and up-down driving means for moving the lamp unit so as to tilt in an up-down direction. The vehicular lamp is characterized in that the right-left driving means and the up-down driving means are provided within a single actuator housing, with an output portion of the right-left driving means structured as a rotational shaft that rotates rightward and leftward, and an output portion of the up-down driving means structured as a retractable shaft that moves in a front-back direction, and an axial direction of the rotational shaft and an axial direction of the retractable shaft are positioned within an identical plane, with the rotational shaft connected to the lamp unit and the retractable shaft connected to a support member that supports the lamp unit.

Thus, according to the vehicular lamp of one or more embodiments of the present invention, the irradiation direction can be precisely changed without generating torsion in the actuator housing and a mechanism accommodated therein because a force generated by the movement of the retractable shaft acts on the axial center of the rotational shaft.

A vehicular lamp according to one or more embodiments of the present invention has a lamp unit that is structured so as to irradiate light forward and is provided tiltable rightward, leftward, upward, and downward within a lamp housing, right-left driving means for moving the lamp unit so as to tilt in a right-left direction; and up-down driving means for moving the lamp unit so as to tilt in an up-down direction. The vehicular lamp is characterized in that the right-left driving means and the up-down driving means are provided within a single actuator housing, with an output portion of the right-left driving means structured as a rotational shaft that rotates rightward and leftward, and an output portion of the up-down driving means structured as a retractable shaft that moves in a front-back direction, and an axial direction of the rotational shaft and an axial direction of the retractable shaft are positioned within an identical plane, with the rotational shaft connected to the lamp unit and the retractable shaft connected to a support member that supports the lamp unit.

Thus, according to the vehicular lamp of one or more embodiments of the present invention, the irradiation direction can be precisely changed without generating torsion in the actuator housing and a mechanism accommodated therein because a force generated by the movement of the retractable shaft acts on the axial center of the rotational shaft.

According to one or more embodiments of the invention, the actuator housing has a symmetrical shape with respect to a plane on which the axial direction of the rotational shaft and the axial direction of the retractable shaft are positioned. Therefore, the actuator is formed by disposing the right-left driving means and the up-down driving means inside a single actuator housing, which allows the actuator to be used in common among lamps respectively disposed on right and left sides of the vehicle. This, in turn, contributes to a reduction in the cost of the vehicular lamp.

According to one or more embodiments of the invention, a power supply connector for supplying power to the right-left driving means and the up-down driving means is disposed on the plane on which the axial direction of the rotational shaft and the axial direction of the retractable shaft are positioned. Therefore, common use of a harness connected to connectors for supplying power to the right-left driving means and the up-down driving means in lamps respectively disposed on right and left sides of the vehicle is possible, which, in turn, contributes to a reduction in the cost of the vehicular lamp.

According to one or more embodiments of the invention, also included are a main bracket that is provided tiltable in the up-down direction and the right-left direction with respect to the lamp housing; and a sub-bracket that is provided tiltable in the up-down direction with respect to the main bracket, wherein the lamp unit is tiltably supported in the right-left direction on the sub-bracket, the actuator housing is fixed to the sub-bracket, and the retractable shall is connected to the main bracket. Therefore, a unit that includes the lamp unit the driving means and the brackets can be used in common among right and left lamps.

Other aspects and advantages of the invention will be apparent from the following description, the drawings and the claims.

DETAILED DESCRIPTION

Figure 1:
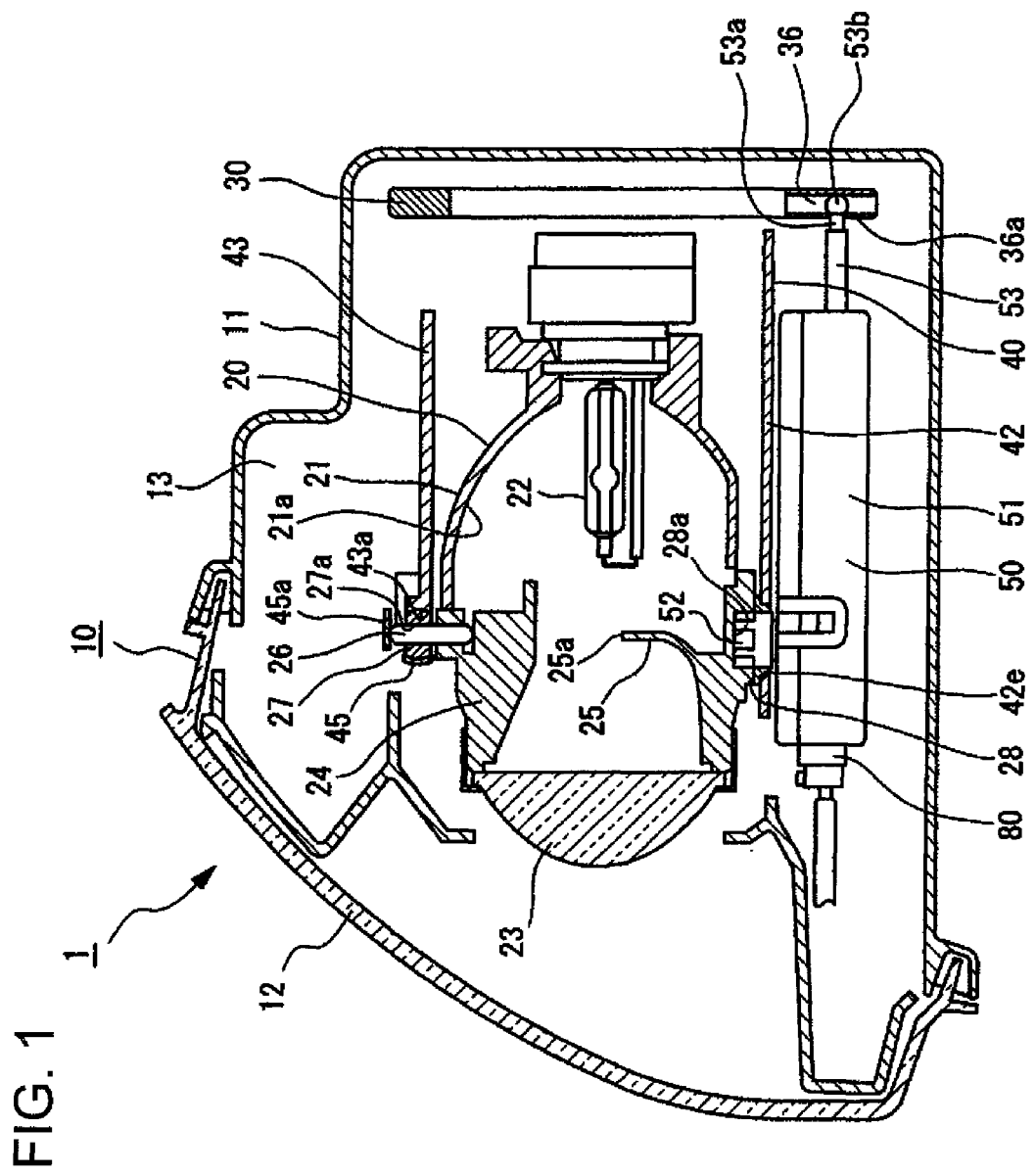
FIG. 1 shows a vehicular lamp according to one or more embodiments of the present invention applied to an automobile headlamp, and is an overall generally vertical cross-sectional view.

Hereinafter, embodiments for carrying out a vehicular lamp of the present invention will be described with reference to the accompanying drawings. Note that embodiments shown in the drawings applies the present invention to an automobile headlamp.

An automobile headlamp 1 is formed such that a lamp unit 20 is disposed inside a lamp chamber 13 of a lamp housing 10, with an irradiation direction changeable in the up-down direction and the right-left direction. The lamp chamber is formed by a transparent cover glass 12 covering a front surface of a lamp body 11, which has a concave portion that opens to the front surface.

The lamp unit 20 is equipped with a reflector 21, a light source body 22, and a projection lens 23. The reflector 21 has a reflective surface 21a with light condensing characteristic, e.g., light from a point light source disposed at a predetermined position is reflected and condensed in a horizontally long manner on a predetermined condensed light region. The light source body 22 may be an incandescent lamp, a discharge lamp, or other suitable lamp, and a light emission portion thereof is positioned at a predetermined position so as to be supported by the reflector 21. A front end of the reflector 21 is attached with an intermediate ring 24, and a shield body 25 is formed on the intermediate ring 24. The shield body 25 is provided so as to position an upper edge 25a thereof in the light condensed region of the reflector 21, and forwardly blocks a portion of light from the light source body 22 that is reflected by the reflective surface 21a.

The projection lens 23 is formed into a convex lens shape whose front surface faces forward while curving outward and whose rear surface is a flat plane. The projection lens 23 is supported by a front end of the intermediate ring 24. In addition, a focal point of the projection lens 23 is positioned generally centered in the right-left direction on the upper edge 25a of the shield body 25, and vertically and horizontally inverts light in the condensed light region, after which the light is projected forward. Accordingly, a pattern beam whose upper end is controlled by the upper edge 25a of the shield body 25 is irradiated forward.

It should be noted that although this embodiment specifies a so-called projector type as the lamp unit 20 above, lamp units according to one or more embodiments of the present invention are not particularly limited to a projector type and any type capable of irradiating a predetermined pattern beam may be applied.

A supported shaft 26 with a generally shaped as a round bar projects from an upper surface of a rear end portion of the intermediate ring 24, and the supported shaft 26 is slidably engaged with a self-aligning metal 27. The self-aligning metal 27 has a generally spherical outer shape, with a supported hole 27a formed running through a center thereof. The supported shaft 26 is slidably inserted into the supported hole 27a.

In addition, a connecting boss 28 projects from a lower surface of the rear end portion of the intermediate ring 24. The connecting boss 28 is formed with a connecting concave portion 28a that opens to the lower surface, and an inner peripheral surface of the connecting concave portion 28a is formed with a plurality of non-slip engagement grooves (not shown).

The lamp unit 20 is supported on the lamp body 11 via a main bracket 30 and a sub-bracket 40.

The main bracket 30 has a generally quadrangular frame shape when viewed from the front-back direction, and nut bodies 31, 31 are supported at both right and left end portions of an upper end portion of the main bracket 30. In addition, a lower end portion of the main bracket 30 is provided with a shaft 32 that projects rearward, and a spherical body 32a is formed integral with a rear end portion of the shaft 32. The spherical body 32a on the rear end portion of the shaft 32 is fitted with a spherical concave portion 33a opening forward on a spherical acceptor 33, which is supported on the lamp body 11. This forms a rotational fulcrum portion with a spherical joint configuration. Two distance adjustment shafts 34, 34 are rotatably supported on the lamp body 11. Threaded shaft portions 34a, 34a of the distance adjustment shafts 34, 34 are threadably mounted on the nut bodies 31, 31 supported on the main bracket 30. Thus, when the distance adjustment shafts 34, 34 are rotated, the threaded shaft portions 34a, 34a are screwed into or out of the nut bodies 31, 31 depending on the direction of rotation. This, in turn, changes a distance between the lamp body 11 and a portion supporting the nut bodies 31, 31 of the main bracket 30. Therefore, it is possible to move the main bracket 30 so as to tilt at will in the up-down direction or the right-left direction by rotationally operating the distance adjustment shafts 34, 34 as appropriate.

Two fulcrum shafts 35, 35 are supported on the main bracket 30. A rear end of the fulcrum shaft 35 has a screw portion 35a, and a front end is formed with a spherical body 35b. Threaded holes 35c, 35c are formed horizontally separated from each other at positions toward the center of a front surface of an upper end portion of the main bracket 30. The screw portions 35a, 35a of the fulcrum shafts 35, 35 are threaded with the threaded holes 35c, 35c. Thus, the fulcrum shafts 35, 35 are provided on the front surface of the upper end portion of the main bracket 30 so as to project forward. Furthermore, a generally round-shaped support hole 36 is provided vertically running through a center portion of the lower end portion of the main bracket 30, and the support hole 36 opens to the front surface through a slit 36a.

The sub-bracket 40 is formed by integrating a main body portion 41 that has a generally quadrangular frame shape when viewed from the front-back direction, a lower surface portion 42 that extends in the front-back direction, and an upper support piece 43 that projects forward from the center of an upper end portion of the main body portion 41. The main body portion 41 projects upward from a position toward a rear end of the lower surface portion 42.

Attachment holes 41a, 41a are formed at positions toward both right and left ends of the upper end portion of the main body portion 41, and spherical acceptors 44, 44 are supported by the attachment holes 41a, 41a. A spherical concave portion (not shown) of the spherical acceptors 44, 44 is rotatably fitted with the spherical bodies 35b, 35b formed on the ends of the fulcrum shafts 35, 35, which are supported on the main bracket 30. Thus, the upper end portion of the sub-bracket 40 is rotatably supported in the up-down direction by the main bracket 30.

A front end portion of the upper support piece 43 is formed with a spherical concave portion 43a whose concavity faces forward. Screw holes 43b, 43b are formed on both sides of the spherical concave portion 43a. In addition, a metal holder 45 is fixed in the front end portion of the upper support piece 43. The metal holder 45 is formed integral with an upper surface portion 45a and a front surface portion 45b. A presser portion 45c is formed at a center portion in the right-left direction of the front surface portion 45b. Additionally, screw insertion holes 45d, 45d are formed on both sides of the presser portion 45c among the front surface portion 45b. A rear surface of the presser portion 45c is formed with a spherical concave surface whose concavity faces rearward.

The self-aligning metal 27 provided in the lamp unit 20 is sandwiched in front and behind by the spherical concave portion 43a of the upper support piece 43 of the sub-bracket 40 and the presser portion 45c of the metal holder 45. In such a state, screws 45e, 45e inserted from the forward direction into the screw insertion holes 45d, 45d of the metal holder 45 are threadably mounted in the screw holes 43b, 43b in the front end of the upper support piece 43 of the sub-bracket 40. Accordingly, the self-aligning metal 27 is rotatably supported between the spherical concave portion 43a of the sub-bracket 40 and the presser portion 45c of the metal holder 45. The upper surface portion 45a of the metal holder 45 is controlled such that the upper end of the supported shaft 26 through which the self-aligning metal 27 is inserted does not move any further upward. Thus, the upper end portion of the lamp unit 20 is rotatably supported in the right-left direction and the up-down direction by the sub-bracket 40. It should be noted that the lamp unit 20 need not be tiltable in the up-down direction, and need only be supported tiltable in the right-left direction with respect to the sub-bracket 40.

Figure 2:
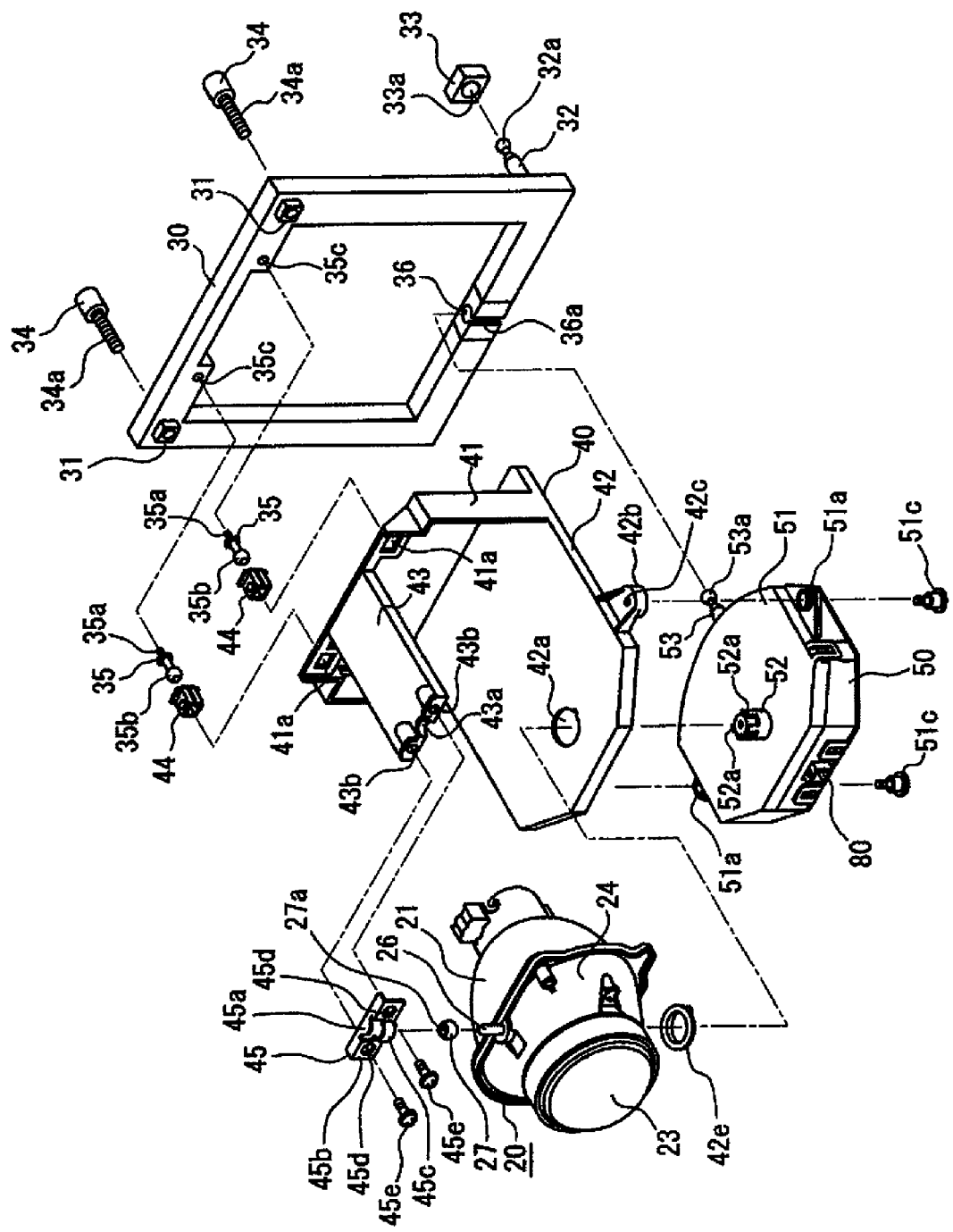
FIG. 2 is an exploded perspective view of a portion of a vehicular lamp according to one or more embodiments of the present invention.

A round-shaped insertion hole 42a is formed at the general center of a lower surface portion of the front end portion 42 of the sub-bracket 40. Support pieces 42b, 42b (of which only one is shown in FIG. 2) are formed projecting toward the right and left on a portion toward the front end of the lower surface portion 42, and the support pieces 42b, 42b are formed with attachment holes 42c, 42c.

A two-axis actuator 50 is supported on a bottom surface of the lower surface portion 42 of the sub-bracket 40. The two-axis actuator 50 moves the lamp unit 20 so as to tilt in the up-down direction and the right-left direction. In addition, the two-axis actuator 50 is structured with right-left driving means and up-down driving means within a single actuator housing 51. A rotational shaft 52, which is an output portion of the right-left driving means, projects from an upper surface of the actuator housing 51, and a retractable shaft 53, which is an output portion of the up-down driving means, projects from a rear surface of the actuator housing 51. A rear end of the retractable shaft 53 is formed integrated with a spherical body 53b via a narrow shaft portion 53a that is more narrow than other portions.

The actuator housing 51 has a symmetrical shape. The rotational shaft 52 and the retractable shaft 53 are disposed on a center line 51c1 that divides the actuator housing 51 into right and left portions in a plane view. Also, the actuator housing 51 is disposed such that the axial direction of the retractable shaft 53 extends along the center line 51c1, while the axial direction of the rotational shaft 52 extends along a vertical plane that includes the center line 51c1. In other words, the axial direction of the rotational shaft 52 and the axial direction of the retractable shaft 53 are positioned within an identical plane.

Supported pieces 51a, 51a project from both right and left side surfaces of the actuator housing 51, and are formed with screw insertion holes 51b, 51b. Attachment screws 51c, 51c are inserted from below through the screw insertion holes 51b, 51b, and are threadably mounted in the attachment holes 42c, 42c of the support pieces 42b, 42b, which are formed in the lower surface portion 42 of the sub-bracket 40. Thus, the two-axis actuator 50 is fixed to the bottom surface of the lower surface portion 42 of the sub-bracket 40.

The rotational shaft 52 of the two-axis actuator 50 is inserted through the insertion hole 42a of the lower surface portion 42 and projects toward a top surface side of the lower surface portion 42. Furthermore, the rotational shaft 52 is engaged within the connecting concave portion 28a of the connecting boss 28 of the lamp unit 20. Engagement projections 52a, 52a, . . . formed on an outer peripheral surface of the upper end of the rotational shaft 52 are engaged with the engagement grooves (not shown) formed on the inner peripheral surface of the connecting concave portion 28a to prevent sliding in the rotational direction with respect to the connecting boss 28 of the rotational shaft 52. Note that an opening edge of the insertion hole 42a formed in the lower surface portion 42 of the sub-bracket 40 is fitted with a thrust metal 42e, and the rotational shaft 52 is inserted through the thrust metal 42e so as to ensure smooth rotation of the rotational shaft 52.

Through the process of fixing the two-axis actuator 50 to the bottom surface of the lower surface portion 42, the spherical body 53b on the rear end of the retractable shaft 53 is also fitted from below into the support hole 36 formed in the main bracket 30. Furthermore, the narrow shaft portion 53a is inserted through the slit 36a.

Thus, when the rotational shaft 52 rotates, the lamp unit 20 connected with the rotational shaft 52 and the connecting boss 28 is moved so as to tilt in the right-left direction due to the rotation of the supported shaft 26 with respect to the self-aligning metal 27 and/or the rotation of the self-aligning metal 27 with respect to the spherical concave portion 43a of the sub-bracket 40 and the presser portion 45c of the metal holder 45. Additionally, movement of the retractable shaft 53 in the front-back direction changes the distance between the actuator housing 51 of the two-axis actuator 50 and the main bracket 30, thus changing the distance between the lower surface portion 42 of the sub-bracket 40 and the main bracket 30. As a consequence, the sub-bracket 40 is moved so as to tilt in the up-down direction with engagement portions between the spherical bodies 35b, 35b of the fulcrum shafts 35, 35 supported on the main bracket 30 and the spherical acceptors 44, 44 supported on the sub-bracket 40 serving as tilt fulcrums. Thus, the lamp unit 20 supported on the sub-bracket 40 is moved so as to tilt in the up-down direction.

When the retractable shaft 53 moves and lamp unit 20 is moved so as to tilt in the up-down direction, because the axial direction of the rotational shaft 52 and the axial direction of the retractable shaft 53 are positioned within the same plane, a force generated by the movement of the retractable shaft 53 acts on the axial center of the rotational shaft 52. Thus, the irradiation direction can be precisely changed without generating torsion in the actuator housing 51 and a mechanism accommodated therein. Note that tilting of the lamp unit 20 in the up-down direction also causes tilting of the two-axis actuator 50 in the up-down direction. However, a resulting angular misalignment between the two-axis actuator 50 and the main bracket 30 is absorbed by the rotation and slight up-down movement of the spherical body 53b on the rear end of the retractable shaft 53, which is accommodated within the support hole 36 of the main bracket 30.

Figure 3:
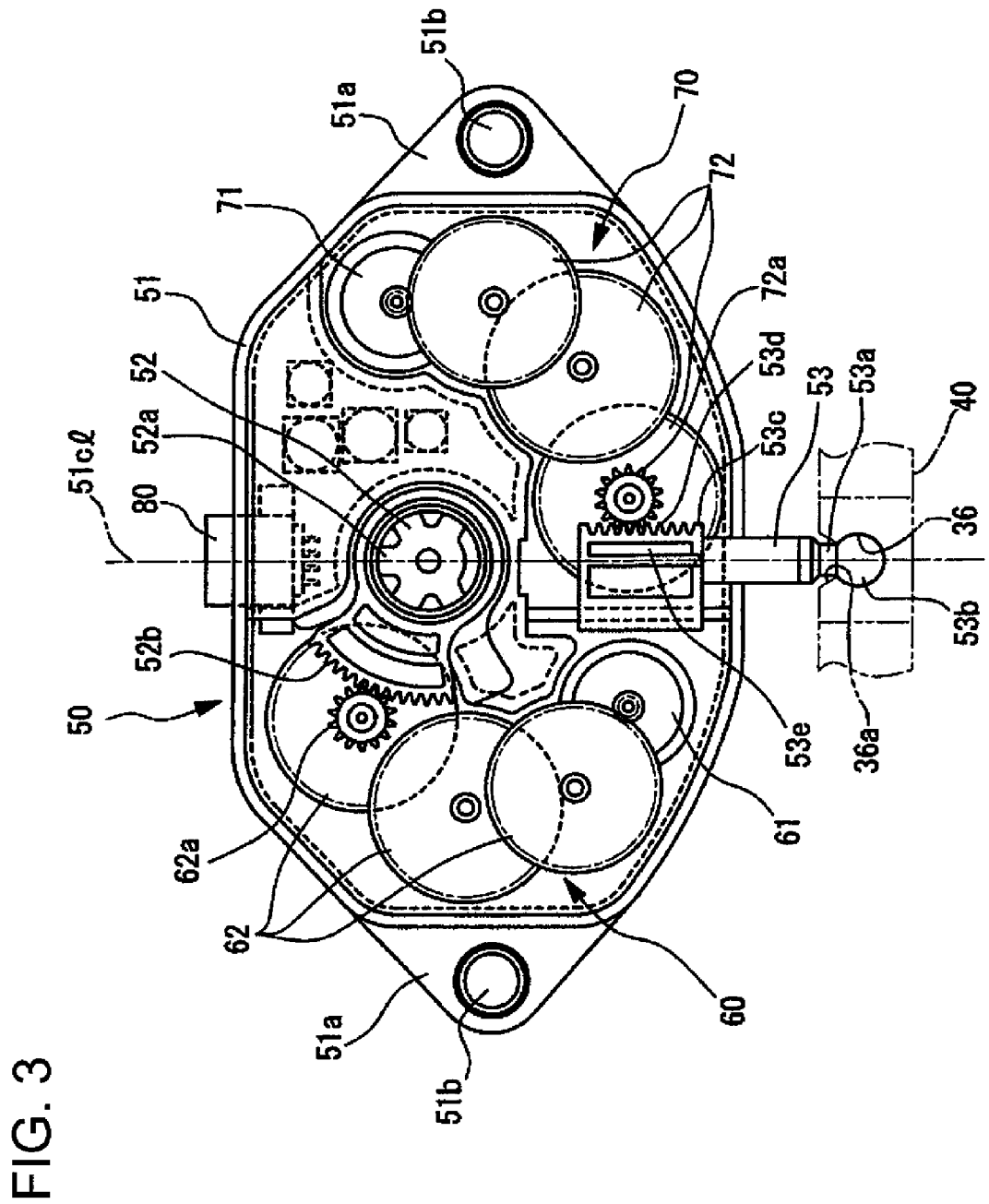
FIG. 3 is a plane view showing an internal portion of an actuator housing.

Next, right-left driving means 60 and up-down driving means 70 within the two-axis actuator 50 will be described with reference to FIG. 3. The right-left driving means 60 are disposed on a left-side space in a plane view within the actuator housing 51, excluding a portion that is the rotational shaft 52, i.e., the output portion. The up-down driving means 70 are disposed on a right-side space in a plane view within the actuator housing 51, excluding a portion that is the retractable shaft 53, i.e., the output portion. It should be noted that in the present embodiment, the right-left driving means 60 are driven in response to steering of the vehicle, and the up-down driving means 70 are driven in response to up-down tilting movement.

A motor 61 that is a drive source of the right-left driving means 60 is disposed on a left side of a rear end portion, and the rotation of the motor 61 is transferred to the rotational shaft 52 via a reduction gear train 62. A sector gear 52b that projects generally leftward is formed integrated with the rotational shaft 52. The sector gear 52b meshes with a pinion gear 62a, which is the last gear on the reduction gear train 62. Thus, when the motor 61 drives, the sector gear 52b is rotated via the reduction gear train 62, which results in rotation of the rotational shaft 52.

A motor 71 that is a drive source of the up-down driving means 70 is disposed on a right side of a front end portion, and the rotation of the motor 71 is transferred to the retractable shaft 53 via a reduction gear train 72. A rack portion 53c is formed integrated with the front end portion of the retractable shaft 53. A rack gear 53d is formed on a right side surface of the rack portion 53c. A left side of the rack gear 53d of the rack portion 53c is formed with a slit 53e, by which the rack gear 53d achieves elasticity in the right-left direction. The rack gear 53d meshes with a pinion gear 72a, which is the last gear on the reduction gear train 72. Thus, when the motor 71 drives, the rack gear 53d is shifted by the pinion gear 72a that is last gear on the reduction gear train 72, which results in movement of the retractable shaft 53 in the front-back direction.

A power supply connector 80 for connecting a harness to supply power to the right-left driving means 60 and the up-down driving means 70 is positioned on the center line 51c1 in a plane view, and opens to the front surface of the actuator housing 51. Therefore, common use of a harness connected to the power supply connectors 80 in lamps respectively disposed on right and left sides of the vehicle is possible, thus contributing to a reduction in the cost of the vehicular lamp.

The shapes and structures of the respective portions specified in the above embodiments are merely examples for carrying out the present invention. While description has been made in connection with embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

1 VEHICULAR HEADLAMP (VEHICULAR LAMP)
10 LAMP HOUSING
20 LAMP UNIT
30 MAIN BRACKET (SUPPORT MEMBER)
40 SUB-BRACKET
51 ACTUATOR HOUSING
52 ROTATIONAL SHAFT
53 RETRACTABLE SHAFT
60 RIGHT-LEFT DRIVING MEANS
70 UP-DOWN DRIVING MEANS
80 POWER SUPPLY CONNECTOR

What is claimed is:

1. A vehicular lamp comprising:
a lamp unit structured so as to irradiate light forward and provided tiltable rightward, leftward, upward, and downward within a lamp housing;
right-left driving means for moving the lamp unit so as to tilt in a right-left direction; and
up-down driving means for moving the lamp unit so as to tilt in an up-down direction,
wherein the right-left driving means and the up-down driving means are provided within a single actuator housing,
wherein an output portion of the right-left driving means structured as a rotational shaft that rotates rightward and leftward,
wherein the rotational shaft is connected to the lamp unit,
wherein an output portion of the up-down driving means structured as a retractable shaft that moves in a front-back direction,
wherein the retractable shaft is connected to a support member that supports the lamp unit, and
wherein an axial direction of the rotational shaft and an axial direction of the retractable shaft are positioned within an identical plane.

2. The vehicular lamp according to claim 1, wherein the actuator housing has a symmetrical shape with respect to a plane on which the axial direction of the rotational shaft and the axial direction of the retractable shaft are positioned.

3. The vehicular lamp according to claim 1, wherein a power supply connector for supplying power to the right-left driving means and the up-down driving means is disposed on the plane on which the axial direction of the rotational shaft and the axial direction of the retractable shaft are positioned.

4. The vehicular lamp according to claim 1, further comprising:
a main bracket that is tiltable in the up-down direction and the right-left direction with respect to the lamp housing; and a sub-bracket that is tiltable in the up-down direction with respect to the main bracket,
wherein the lamp unit is tiltably supported in the right-left direction on the sub-bracket,
wherein the actuator housing is fixed to the sub-bracket, and
wherein the retractable shaft is connected to the main bracket.

5. A vehicular lamp comprising:
a lamp unit disposed within a lamp housing;
a right-left actuator capable of tilting the lamp unit in a right-left direction, the right-left actuator comprising a rotational shaft connected to the lamp unit; and
an up-down actuator capable of tilting the lamp unit in an up-down direction, the up-down actuator comprising a retractable shaft connected to a support member that supports the lamp unit,
wherein the right-left actuator and the up-down actuator are provided within a single actuator housing, and
wherein an axial direction of the rotational shaft and an axial direction of the retractable shaft are positioned within an identical plane.

6. The vehicular lamp according to claim 5, wherein the actuator housing has a symmetrical shape with respect to a plane on which the axial direction of the rotational shaft and the axial direction of the retractable shaft are positioned.

7. The vehicular lamp according to claim 5, wherein
a power supply connector for supplying power to the right-left actuator and the up-down actuator is disposed on the plane on which the axial direction of the rotational shaft and the axial direction of the retractable shaft are positioned.

8. The vehicular lamp according to claim 5, further comprising:
a main bracket tiltable in the up-down direction and the right-left direction with respect to the lamp housing; and
a sub-bracket tiltable in the up-down direction with respect to the main bracket,
wherein the lamp unit is tiltably supported in the right-left direction on the sub-bracket,
wherein the actuator housing is fixed to the sub-bracket, and
wherein the retractable shaft is connected to the main bracket.

* * * * *